United States Patent [19]

Bloomer et al.

[11] Patent Number: 5,597,634
[45] Date of Patent: Jan. 28, 1997

[54] CHANGEABLE MEDIA LABELS

[75] Inventors: Glenn A. Bloomer, Maplewood; Daniel L. VanLanen, Roseville, both of Minn.

[73] Assignee: Minnesota Mining and Manufacturing Company, St. Paul, Minn.

[21] Appl. No.: 459,289

[22] Filed: Jun. 2, 1995

Related U.S. Application Data

[63] Continuation of Ser. No. 245,978, May 19, 1994, abandoned.

[51] Int. Cl.$^6$ ................................................ B42D 15/00
[52] U.S. Cl. .................. 428/40.1; 40/299; 40/360; 383/81; 383/94; 383/101; 428/42.2; 428/42.3; 428/77; 428/78; 428/79; 428/137; 428/138; 428/192; 428/202; 428/211; 428/212; 428/214; 428/354
[58] Field of Search ...................... 428/40, 41, 42, 428/77, 78, 79, 137, 138, 192, 202, 211, 212, 214, 354, 355; 283/81, 94, 101; 156/62; 40/299, 360; 206/387

[56] References Cited

U.S. PATENT DOCUMENTS

| | | | |
|---|---|---|---|
| 3,508,754 | 4/1970 | Shorin | 428/40 |
| 4,355,824 | 10/1982 | Weber et al. | 283/21 |
| 4,507,883 | 4/1985 | Tarrant | 40/299 |
| 4,583,765 | 4/1986 | Messinger | 283/81 |
| 4,589,685 | 5/1986 | Lazar | 283/81 |
| 4,589,686 | 5/1986 | McGrew | 283/85 |
| 4,599,265 | 7/1986 | Esmay | 428/355 |
| 4,609,208 | 9/1986 | Wrobel | 283/81 |
| 4,619,858 | 10/1986 | Dam et al. | 428/211 |
| 4,621,442 | 11/1986 | Mack | 40/299 |
| 4,621,837 | 11/1986 | Mack | 283/105 |
| 4,696,706 | 9/1987 | Griffin et al. | 428/42 |
| 4,708,285 | 11/1987 | Segall | 229/68 R |
| 4,757,901 | 7/1988 | Woods | 206/575 |
| 4,770,320 | 9/1988 | Miles et al. | 221/33 |
| 4,895,746 | 1/1990 | Mertens | 428/40 |
| 4,907,825 | 3/1990 | Miles et al. | 281/51 |
| 4,973,088 | 11/1990 | Levy | 283/81 |
| 5,195,265 | 3/1993 | Klingenberg | 40/638 |

FOREIGN PATENT DOCUMENTS

| | | |
|---|---|---|
| 2038779 | 8/1971 | France . |
| WO91/04161 | 4/1991 | WIPO . |
| WO91/05322 | 4/1991 | WIPO . |

*Primary Examiner*—Nasser Ahmad
*Attorney, Agent, or Firm*—Gary L. Griswold; Walter N. Kirn; Charles D. Levine

[57] ABSTRACT

A changeable label pad has a base label layer which can be adhesively attached to a recording media container. A first adhesive having a first strength attaches the base label layer to the container. At least two label segments are attached to the base label layer. The label segments combine to cover most of the base label layer and the label segments are separated from each other. A second adhesive having a second strength which is weaker than that of the first adhesive attaches the label segments to the base label layer. The total area of all of the label segments in a layer of label segments is less than the total area of all of the label segments in an underlying layer of label segments.

29 Claims, 4 Drawing Sheets

CHANGEABLE MEDIA LABELS

This is a continuation of application Ser. No. 08/245,978 filed May 19, 1994 now abandoned.

TECHNICAL FIELD

This invention relates to label pads for labelling magnetic recording media.

BACKGROUND OF THE INVENTION

One of the useful features of magnetic recording media is that it can be re-used many times, by recording new material over previously recorded material. As a result, it is desirable that any labelling of the magnetic media, such as adhesive labels attached to videocassettes, should be readily alterable, to accurately describe the material currently recorded on the magnetic media.

One alterable label for a rerecordable medium is disclosed in U.S. Pat. No. 5,195,265, in which a pad having several layers of adhesively attached labels is attached to a videocassette. Initially, the top label in the pad is used to indicate the recorded contents of the videocassette. If the recorded contents are altered, the top label is peeled off, exposing the next label, upon which new labelling information can be written. Peeling off of the top label is facilitated by a nonadhesive tab at one edge of the label, which enables the top label to be easily selected and firmly grasped for removal. A disadvantage of this system is that the nonadhesive tabs may get folded outwardly and catch on various objects, such as the apparatus used to record or play the cassette.

A pad of peelable labels without nonadhesive tabs is disclosed in U.S. Pat. No. 4,973,088. Here separation of the top label from the next label is facilitated by a stepped, or staggered, configuration. The top label is indented slightly from the next label, which is, in turn, indented slightly from the label below it. This allows a fingernail or sharp object to rest upon the second label while being inserted beneath the first label, to enable the top label to be removed without disturbing the next label in the pad.

Regardless of the particular configuration used for videocassette labels, it is preferred that the label be made of paper, since paper is low in cost and easily written upon by a variety of writing instruments. Paper, however, is temperature and humidity sensitive. With very long paper labels, such as described above, which might be used to label a videocassette, the expansion and contraction of the paper can lead to curling of the labels, which is detrimental to the appearance of the videocassette, and can reduce label adhesion. An additional disadvantage of known labels for magnetic recording media is that when relabelling, the entire label must be replaced, even when only a portion of the recorded material has been altered.

SUMMARY OF THE INVENTION

The present invention is a changeable label pad having a base label layer which can be adhesively attached to an information container such as a recording media container. A first adhesive having a first strength attaches the base label layer to the information container. At least two label segments are attached to the base label layer. The label segments combine to cover most of the base label layer and the label segments are separated from each other by at least a separation. A second adhesive having a second strength which is weaker than that of the first adhesive attaches the label segments to the base label layer.

In one embodiment, at least two stacks of label segments are attached to the base label layer. Adjacent label segments in each layer of the stack are separated from each other by at least a separation. The separation can be a transverse gap. The separation of the label layers into label segments reduces curling of the labels under conditions of extreme variations in humidity and temperature, and allows a portion of a label to be changed without requiring the entire label to be rewritten.

The total area of all of the label segments in a first layer of label segments is less than the total area of all of the label segments in a second layer of label segments to which the first layer is adhered to form peeling steps. The peeling steps can be formed at the longitudinal ends of the label pad or adjacent the transverse gap of the label pad. Also, an identification area can formed on the base layer and extend beyond the first layer of label segments.

DETAILED DESCRIPTION

Figure 1:
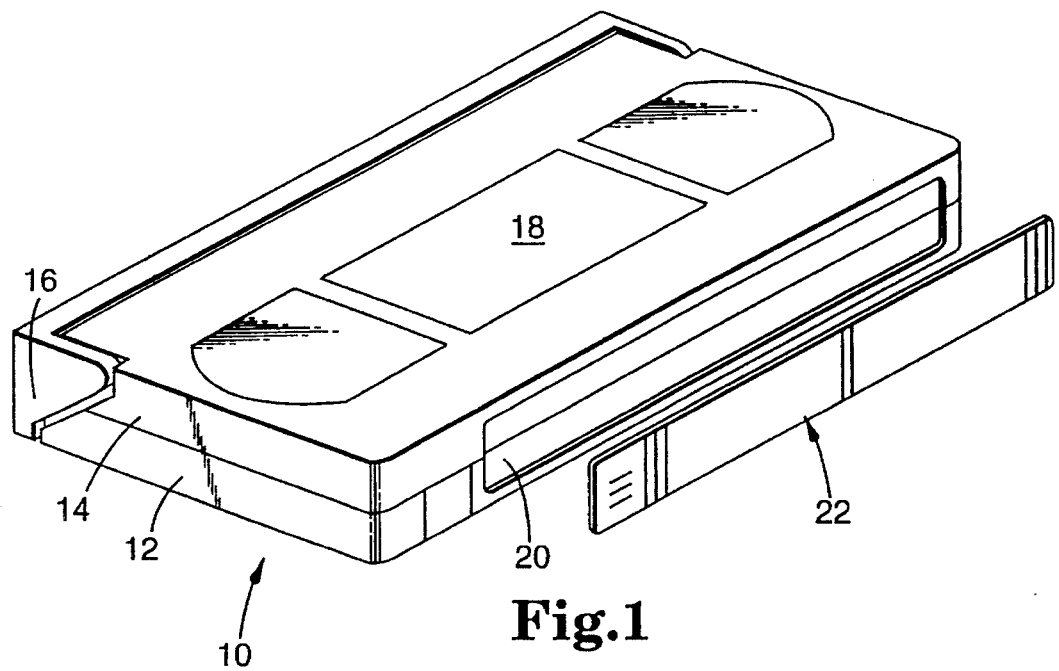
FIG. 1 is a perspective view of a pad of labels according to the present invention being applied to the edge label area of a VHS videocassette.

FIG. 1 shows a VHS videocassette 10, including a base 12, a cover 14, a door 16, an indented cover label area 18, and an indented rear side label area 20. A label pad 22 is positioned for attachment to an indented edge label area 20 of the cassette 10. Additionally, the label pad 22 can be used with other format cassettes, diskettes, folders, and any other information containers requiring multiple relabeling and the labels can be any shape, whether for aesthetics or to accommodate a particular use. The label pad 22 is a changeable, reusable pad. It is readily alterable to accurately describe the material currently recorded on the magnetic media.

Figure 2:
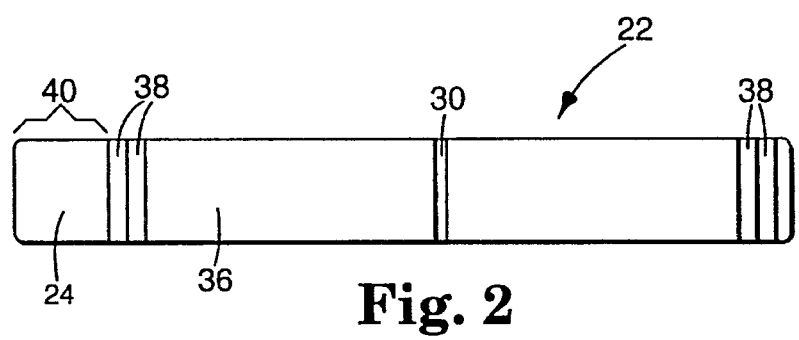
FIG. 2 is a top view of the pad of labels.

To accommodate manufacturing and label placement tolerances, as well as expansion and contraction of the label material under varying environmental conditions, the length L and width W of the label pad 22, shown in FIG. 2, should be slightly less than the corresponding dimensions of the indented label area 20. A suitable length L for the label pad 22 is 136 mm (5.35 in), and a suitable width W is 19 mm (0.75 in). Typical corresponding dimensions of the label area 20 are 150 mm (5.9 in) and 21 mm (0.83 in), respectively. Thus, the length L and width W of the label pad 22 are about 10% less than the corresponding dimensions of the label area 20. This dimensional allowance is based upon the use of paper as the label material. If other less humidity-sensitive material is used, the length L and width W of the label pad 22 can be slightly greater, coinciding more nearly with the corresponding dimensions of the indented area 20. Also, as shown, the labels can have rounded corners.

Figure 3:
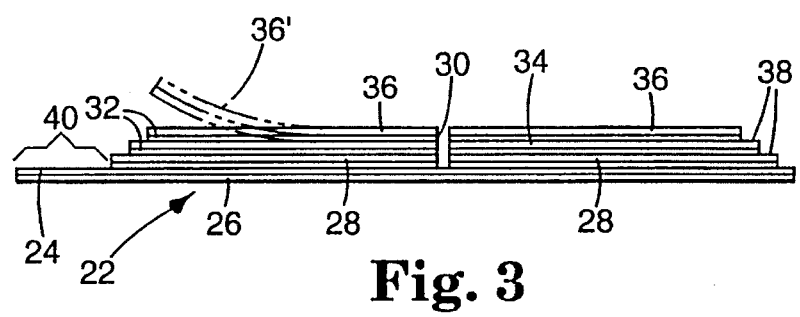
FIG. 3 is a side view of the pad of labels of FIG. 2.

Referring to FIGS. 2 and 3, the label pad 22 includes a base label layer 24, which can be adhesively attached to the cassette label area 20 by a relatively strong adhesive layer 26. The adhesive layer 26 is preferably a pressure sensitive label adhesive of the type well-known in the art such as 3M material #AP380 acrylic.

A pair of label segments 28, separated by a transverse gap 30, are attached to the base label layer 24 by a lower strength, peelable adhesive 32. The transverse gap 30 runs transverse to the length L of the label pad 22. The peelable adhesive 32 can be any adhesive which allows a label layer to be peeled from the next lower label layer without damage to the lower layer. Suitable peelable adhesives are disclosed in U.S. Pat. No. 4,599,265, assigned to Minnesota Mining and Manufacturing Company, St. Paul, Minn. The label segments 28 are separate from each other and from the base label layer 24. The label segments 28 are adhered to the base label layer 24 but are not connected to it such as through perforated label connections. The label segments 28 can abut each other but also are not connected to each other such as through perforated label connections.

Similarly, a pair of label segments 34 are adhesively attached to the label segments 28, again separated by transverse gap 30, using peelable adhesive 32, and top label segments 36 are similarly attached to label segments 34, separated by the transverse gap 30, using peelable adhesive 32. The label segments 34 are not connected to adjacent layers of label segments or to each other such as through perforated label connections. Additional pairs of label segments 34 can be adhesively attached to lower pairs of label segments 34 to form a stack. Label pads 22, having up to eight total layers of label segments, have been made. By changing the adhesives and the label thickness, additional layers can be added.

Top label segments 36 are used as the label when the cassette is first recorded upon. The recorded information is identified on this label segment. When changes are made to the recorded material, as might occur when a portion of the media is recorded over, the label segment 36 containing the changed material is peeled from the pad and the new label information is written on the next label segment 34 which becomes the top label segment 36. It is an advantage of the present invention that only the label segment 36 containing altered information needs to be removed. Where the original information is written on only one of the pairs of label segments 36, the new label information can be written on the other of the label segments 36. In this situation, it may not be necessary to remove the label segment 36 with the old information.

The total area of all of the label segments 28, 34, 36 in a layer of label segments is less than the total area of all of the label segments in the underlying layer of label segments closer to the base label layer 24 to which the first layer is adhered. Successive layers of label segments are staggered. This forms a series of peeling steps 38. Peeling of the label segment 36 from the label segment 34 can be performed by resting an object, such as a fingernail or thin or sharp tools, on a peeling step 38. Then, the object is moved toward the layer of label segments 36, and the top label segment is lifted to a position such as shown at 36'. Here, it can be grasped and peeled from the underlying layer of label segments 34 or from the base label layer 24 if no other underlying label segments 34 exist. The transverse gap 30 allows the other, non-peeled label segment 36 to remain unchanged, obviating the need for rewriting of this portion of the label.

An additional advantage of the transverse gap 30 is that it enables the label pad 22 to withstand extremes of temperature and humidity without suffering the curling or other damage which has been found to occur in peelable labels having a large length L. A suitable width G for the transverse gap 30 is 1.6 mm (0.0625 in). Paper videocassette labels having a length L of 136 mm, but without a transverse gap 30, were found to curl and exhibit a damaged appearance when subjected to an environment of 40° C. (104° F.) and 80% humidity for 4 days. Paper videocassette labels having substantially the same dimensions as those which curled in the humidity test, but with the added feature of transverse gap 30, were found to withstand an environment of 40° C. and 80% humidity for 4 days without visible damage.

Figure 4:
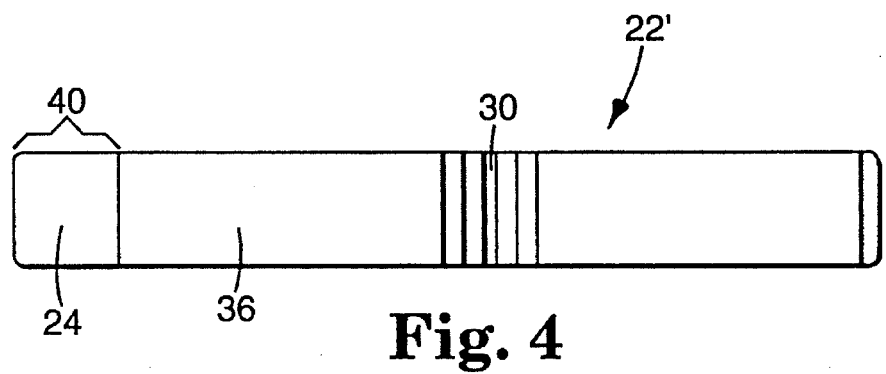
FIG. 4 is a top view of another embodiment of a pad of labels according to the present invention.
Figure 5:
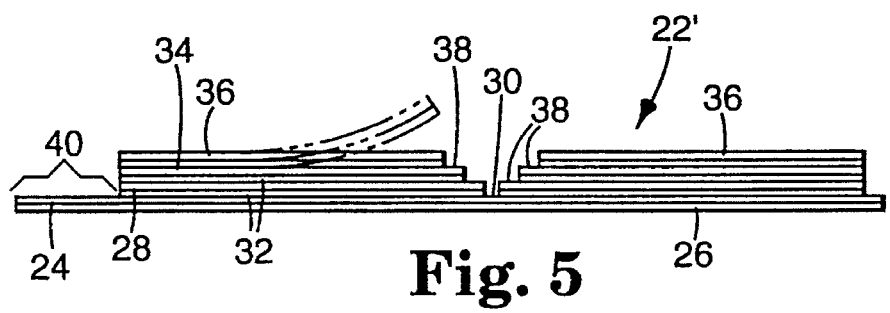
FIG. 5 is a side view of the pad of labels of FIG. 4.
Figure 6:
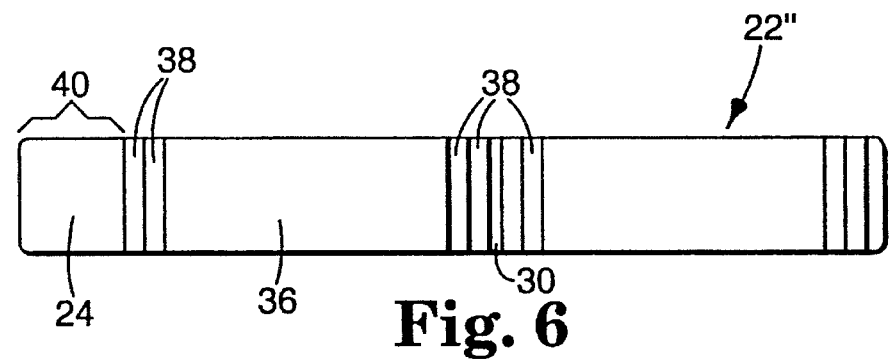
FIG. 6 is a top view of another embodiment of a pad of labels according to the present invention.
Figure 7:
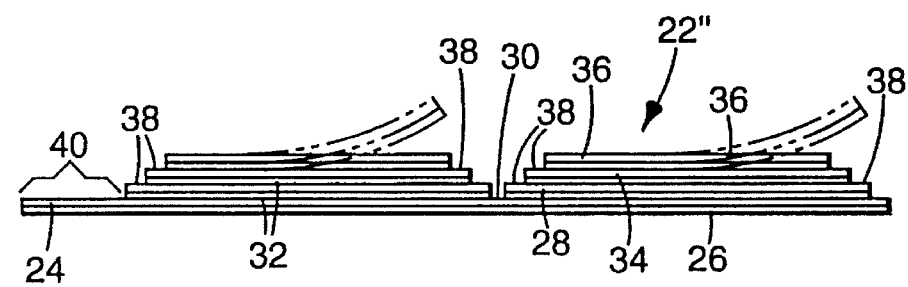
FIG. 7 is a side view of the pad of labels of FIG. 6.
Figure 8:
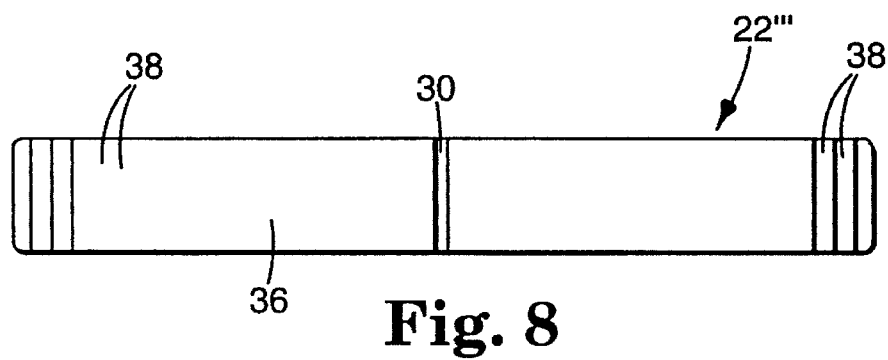
FIG. 8 is a top view of another embodiment of a pad of labels according to the present invention.
Figure 9:
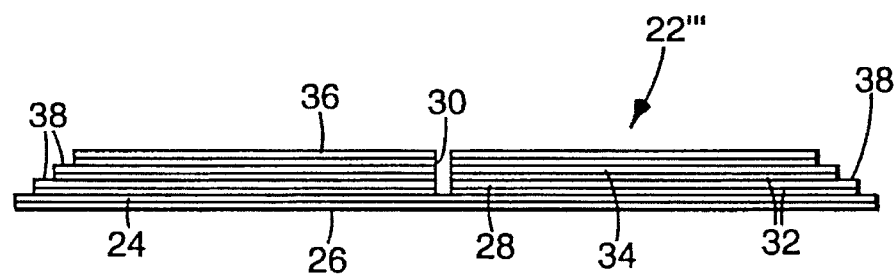
FIG. 9 is a side view of the pad of labels of FIG. 8.
Figure 10:
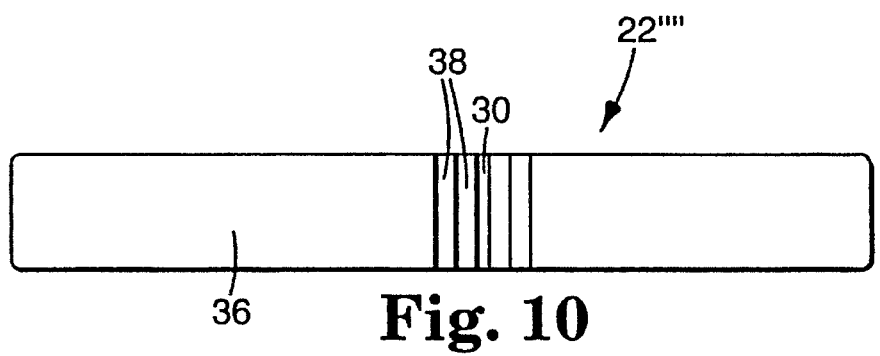
FIG. 10 is a top view of another embodiment of a pad of labels according to the present invention.
Figure 11:
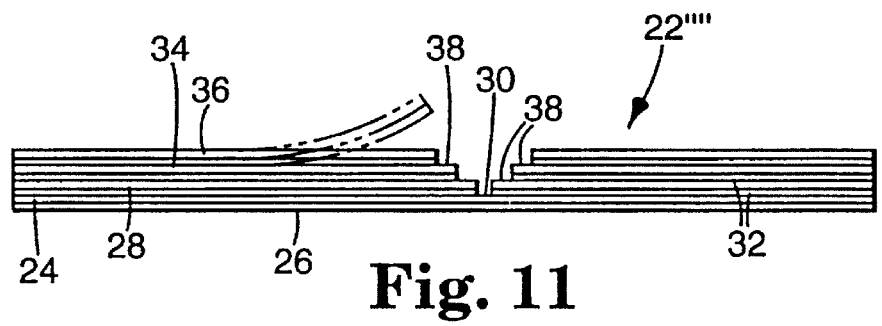
FIG. 11 is a side view of the pad of labels of FIG. 10.
Figure 12:
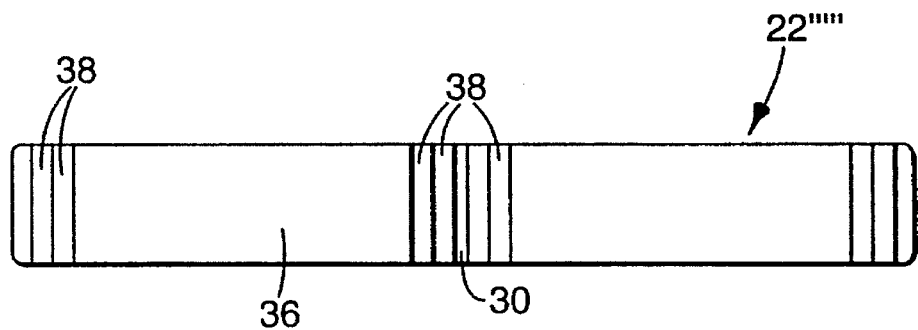
FIG. 12 is a top view of another embodiment of a pad of labels according to the present invention.
Figure 13:
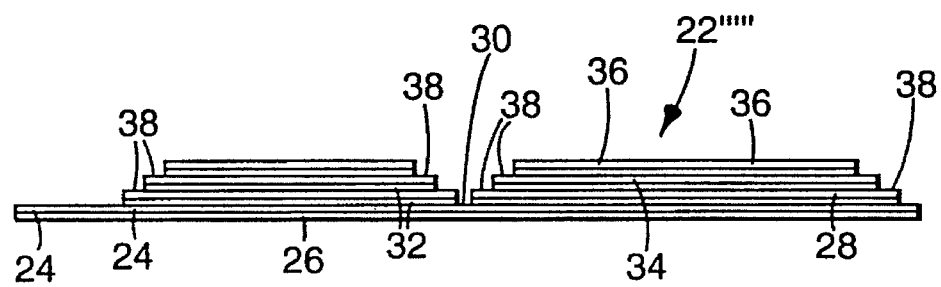
FIG. 13 is a side view of the pad of labels of FIG. 12.

In an alternative embodiment, shown in FIGS. 4 and 5, peeling steps 38 can be placed in the transverse gap 30 area, so that peeling is initiated from the center of the label area, rather than from the end. In the embodiment of FIGS. 6 and 7, peeling steps 38 can be provided at both the ends of the labels and in the center.

In the embodiments of FIGS. 3–7, an identification area 40 is provided as part of the base label layer 24. It is not necessary to provide an identification area 40, and in some cases it might be preferable to eliminate it, to provide a larger area for user-written labels, as in the embodiments shown in FIGS. 8–13. The embodiments of FIGS. 8 and 9, 10 and 11, and 12 and 13 correspond to those of FIGS. 2 and 3, 4 and 5, and 6 and 7, respectively.

Figure 14:
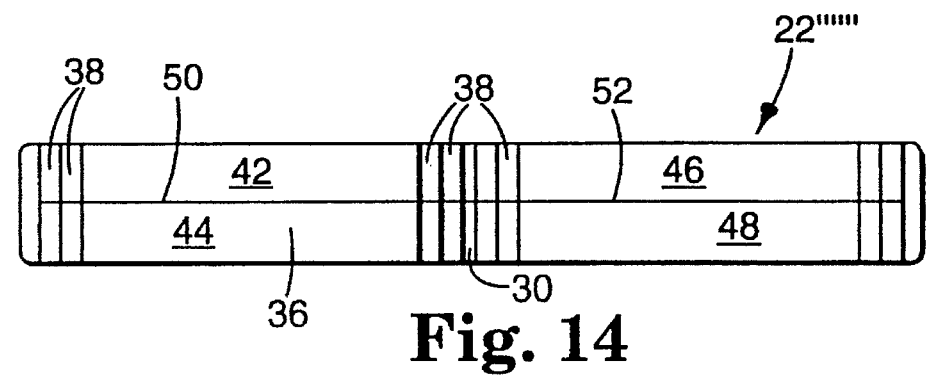
FIG. 14 is a top view of another embodiment of a pad of labels according to the present invention.

In the embodiment shown in FIG. 14, each label layer has four separate label segments. Each layer includes labels 42, 44, 46, 48 with the labels 42 and 44 being separated from the labels 46 and 48 by the transverse gap 30. The labels 42 are separated from the labels 44 by a longitudinal separation 50 such as a cut, and the labels 46 are separated from the labels 48 by longitudinal separation 52 such as a cut.

The number of separate label segments into which each label layer is divided is not critical, but is limited by the resulting size of the labels. While the disclosed embodiments provide only one transverse gap 30, it is possible that more than one transverse gap, additional transverse slits, or other separations could be used to provide any number of labels. Also, the number of label layers is not critical, but is limited by the allowable overall thickness of the label pad, since excessively thick label pads could interfere with use of a videocassette, or could be susceptible to damage. Fewer than three label layers could be used, but this could inconvenience the user if the magnetic medium is relabelled many times.

We claim:

1. A changeable label pad for attaching to an information container during use, for marking on to indicate information about the information container, wherein the information container has a label area, and wherein the changeable label pad has a length and comprising:

a base label layer which can adhesively attach the changeable label pad to the information container, wherein the base label layer is shaped to conform to the shape of the label area on the information container;

a first adhesive for attaching the base label layer to the information container; and a stack of labels comprising:

a first label comprising at least two label segments attached to the base label layer, wherein the first label segments combine to cover at least most of the base label layer, wherein the first label segments are separated from each other by at least a separation;

a second label comprising at least two label segments attached to the first label, wherein the second label segments combine to cover at least most of the first label segments, and wherein the second label segments are separated from each other by at least a separation; and a second adhesive for attaching the first label segments to the base label layer and the second label segments to the first label segments, wherein the label segments remain on the label pad and the label pad remains on the information container during use, wherein the label segments are marked on to indicate information about the information container to which the pad is attachable, and when it is desired to change the markings, the marked label segments can be removed from the information container to permit another label segment to be marked on;

wherein the label segments separation comprises means for reducing curling of the labels under conditions of extreme variations in humidity and temperature, wherein the reducing means comprises a transverse gap which runs transverse to the length of the label pad and which has a maximum width of 1.6 mm.

2. The label pad of claim 1 wherein the second adhesive has a strength which is weaker than the strength of the first adhesive.

3. The label pad of claim 1 wherein only the label segment containing changed information needs to be removed such that where the original information is on only one of the pairs of label segments the new label information can be placed on the other of the label segments with our requiring removal of the label with the old information.

4. The label pad of claim 1 which is shaped to be used on a recording medium structure.

5. A changeable label pad for attaching to an information container during use, for marking on to indicate information about the information container, wherein the information container has a label area, and wherein the changeable label pad has a length and comprising:

a base label layer which can adhesively attach the changeable label pad to the information container, wherein the base label layer is shaped to conform to the shape of the label area on the information container;

a first adhesive for attaching the base label layer to the information container; and a stack of labels comprising:

a first label comprising at least two label segments attached to the base label layer, wherein the first label segments combine to cover at least most of the base label layer, wherein the first label segments are separated from each other by at least a separation;

a second label comprising at least two label segments attached to the first label, wherein the second label segments combine to cover at least most of the first label segments, and wherein the second label segments are separated from each other by at least a separation; and a second adhesive for attaching the first label segments to the base label layer and the second label segments to the first label segments, wherein the label segments remain on the label pad and the label pad remains on the information container during use, wherein the label segments are marked on to indicate information about the information container to which the pad is attachable, and when it is desired to change the markings, the marked label segments can be removed from the information container to permit another label segment to be marked on;

wherein the label segments separation is a cut.

6. A changeable label pad for attaching to an information container during use, for marking on to indicate information about the information container, wherein the information container has a label area, and wherein the changeable label pad has a length and comprising:

a base label layer which can adhesively attach the changeable label pad to the information container, wherein the base label layer is shaped to conform to the shape of the label area on the information container;

a first adhesive for attaching the base label layer to the information container; and a stack of labels comprising:

a first label comprising at least two label segments attached to the base label layer, wherein the first label segments combine to cover at least most of the base label layer, wherein the first label segments are separated from each other by at least a separation;

a second label comprising at least two label segments attached to the first label, wherein the second label segments combine to cover at least most of the first label segments, and wherein the second label segments are separated from each other by at least a separation; and a second adhesive for attaching the first label segments to the base label layer and the second label segments to the first label segments, wherein the label segments remain on the label pad and the label pad remains on the information container during use, wherein the label segments are marked on to indicate information about the information container to which the pad is attachable, and when it is desired to change the markings, the marked label segments can be removed from the information container to permit another label segment to be marked on;

wherein the total area of all of the label segments in a first layer of label segments is greater than the total area of all of the label segments in a second layer of label segments to which the first layer is adhered to form peeling steps, wherein the label segments separation is a transverse gap, wherein the transverse gap runs transverse to the length of the label pad, and wherein the peeling steps are formed adjacent the transverse gap of the label pad.

7. The label pad of claim 6 wherein the peeling steps are formed at the longitudinal ends of the label pad.

8. The label pad of claim 1 further comprising an identification area formed on the base layer, wherein the identification layer extends substantially beyond the first layer of label segments.

9. The label pad of claim 1 wherein the stack of labels further comprises a third label comprising at least two label segments attached to the second label, wherein the third label segments combine to cover at least most of the second label segments, wherein the third label segments are separated from each other by at least a separation, and wherein the second adhesive attaches the third label segments to the second label segments.

10. The label pad of claim 9 wherein the stack of labels further comprises:

- a fourth label comprising at least two label segments attached to the third label, wherein the fourth label segments combine to cover at least most of the third label segments, wherein the fourth label segments are separated from each other by at least a separation, and wherein the second adhesive attaches the fourth label segments to the third label segments; and
- a fifth label comprising at least two label segments attached to the fourth label, wherein the fifth label segments combine to cover at least most of the fourth label segments, wherein the fifth label segments are separated from each other by at least a separation, and wherein the second adhesive attaches the fifth label segments to the fourth label segments.

11. The label pad of claim 1 wherein the first label comprises four label segments and the second label comprises four label segments.

12. The label pad of claim 1 wherein each label has a length and a width and the separation has a length which is parallel to the width of each label, and wherein the length of the second label is shorter than the length of the first label.

13. A changeable label pad for attaching to an information container during use, for marking on to indicate information about the information container, wherein the information container has a label area, and wherein the changeable label pad has a length and comprising:

- a base label layer which can adhesively attach the changeable label pad to the information container, wherein the base label layer is shaped to conform to the shape of the label area on the information container;
- a first adhesive for attaching the base label layer to the information container; and
- a stack of labels comprising:
  - a first label comprising at least two label segments attached to the base label layer, wherein the first label segments combine to cover at least most of the base label layer, wherein the first label segments are separated from each other by at least a separation;
  - a second label comprising at least two label segments attached to the first label, wherein the second label segments combine to cover at least most of the first label segments, and wherein the second label segments are separated from each other by at least a separation; and
- a second adhesive for attaching the first label segments to the base label layer and the second label segments to the first label segments wherein, the label segments remain on the label pad and the label pad remains on the information container during use, wherein the label segments are marked on to indicate information about the information container to which the pad is attachable, and when it is desired to change the markings, the marked label segments can be removed from the information container to permit another label segment to be marked on;

wherein the label segments separation comprises means for reducing curling of the labels under conditions of extreme variations in humidity and temperature, and wherein the reducing means comprises a transverse gap which runs transverse to the length of the label pad and which has a minimum width of 0.3 mm.

14. The label pad of claim 5 wherein the second adhesive has a strength which is weaker than the strength of the first adhesive.

15. The label pad of claim 5 wherein only the label segment containing changed information needs to be removed such that where the original information is on only one of the pairs of label segments the new label information can be placed on the other of the label segments without requiring removal of the label segment with the old information.

16. The label pad of claim 5 which is shaped to be used on a recording medium structure.

17. The label pad of claim 5 further comprising an identification area formed on the base layer, wherein the identification layer extends substantially beyond the first layer of label segments.

18. The label pad of claim 5 wherein the stack of labels further comprises a third label comprising at least two label segments attached to the second label, wherein the third label segments combine to cover at least most of the second label segments, wherein the third label segments are separated from each other by at least a separation, and wherein the second adhesive attaches the third label segments to the second label segments.

19. The label pad of claim 18 wherein the stack of labels further comprises:

- a fourth label comprising at least two label segments attached to the third label, wherein the fourth label segments combine to cover at least most of the third label segments, wherein the fourth label segments are separated from each other by at least a separation, and wherein the second adhesive attaches the fourth label segments to the third label segments; and
- a fifth label comprising at least two label segments attached to the fourth label, wherein the fifth label segments combine to cover at least most of the fourth label segments, wherein the fifth label segments are separated from each other by at least a separation, and wherein the second adhesive attaches the fifth label segments to the fourth label segments.

20. The label pad of claim 5 wherein the first label comprises four label segments and the second label comprises four label segments.

21. The label pad of claim 5 wherein each label has a length and a width and the separation has a length which is parallel to the width of each label, and wherein the length of the second label is shorter than the length of the first label.

22. The label pad of claim 13 wherein the second adhesive has a strength which is weaker than the strength of the first adhesive.

23. The label pad of claim 13 wherein only the label segment containing changed information needs to be removed such that where the original information is on only one of the pairs of label segments the new label information can be placed on the other of the label segments without requiring removal of the label segment with the old information.

24. The label pad of claim 13 which is shaped to be used on a recording medium structure.

25. The label pad of claim 13 further comprising an identification area formed on the base layer, wherein the identification layer extends substantially beyond the first layer of label segments.

26. The label pad of claim 13 wherein the stack of labels further comprises a third label comprising at least two label segments attached to the second label, wherein the third label segments combine to cover at least most of the second label segments, wherein the third label segments are separated from each other by at least a separation, and wherein the second adhesive attaches the third label segments to the second label segments.

27. The label pad of claim 26 wherein the stack of labels further comprises:

a fourth label comprising at least two label segments attached to the third label, wherein the fourth label segments combine to cover at least most of the third label segments, wherein the fourth label segments are separated from each other by at least a separation, and wherein the second adhesive attaches the fourth label segments to the third label segments; and a fifth label comprising at least two label segments attached to the fourth label, wherein the fifth label segments combine to cover at least most of the fourth label segments, wherein the fifth label segments are separated from each other by at least a separation, and wherein the second adhesive attaches the fifth label segments to the fourth label segments.

28. The label pad of claim 13 wherein the first label comprises four label segments and the second label comprises four label segments.

29. The label pad of claim 13 wherein each label has a length and a width and the separation has a length which is parallel to the width of each label, and wherein the length of the second label is shorter than the length of the first label.

* * * * *